Aug. 18, 1931.  H. H. NICHOLSON  1,819,436
APPARATUS FOR ROASTING ORES
Filed July 30, 1929  7 Sheets-Sheet 1

Fig.1.

H. H. Nicholson, Inventor
By C. A. Snow & Co.
Attorneys.

Aug. 18, 1931.  H. H. NICHOLSON  1,819,436
APPARATUS FOR ROASTING ORES
Filed July 30, 1929  7 Sheets-Sheet 2

Fig. 2.

H. H. Nicholson, Inventor
By C. A. Snow & Co.
Attorneys.

Aug. 18, 1931.   H. H. NICHOLSON   1,819,436
APPARATUS FOR ROASTING ORES
Filed July 30, 1929   7 Sheets-Sheet 4

H. H. Nicholson Inventor

By C. A. Snow & Co.
Attorneys.

Aug. 18, 1931.  H. H. NICHOLSON  1,819,436
APPARATUS FOR ROASTING ORES
Filed July 30, 1929  7 Sheets-Sheet 7

H. H. Nicholson, Inventor
By C. A. Snow & Co.
Attorneys

Patented Aug. 18, 1931

1,819,436

UNITED STATES PATENT OFFICE

HENRY HARRISON NICHOLSON, OF OLD WASHINGTON, OHIO

APPARATUS FOR ROASTING ORES

Application filed July 30, 1929. Serial No. 382,165.

This invention relates to an apparatus for roasting ores, one of the objects being to subject the finely comminuted ore to constant agitation while being heated at a low temperature, the mechanism utilized for this purpose serving to advance the ore intermittently through the apparatus following successive periods of agitation.

Another object is to provide ore roasting apparatus utilizing means for controlling the admission of air to the ore chamber.

A further object is to provide a bath for the ore following the roasting operation, this bath serving to remove from the ore any films or particles of sulphur and other deleterious matter that might be commingled with the ore.

A still further object is to provide control of the gases released from the roasting ores that they may be used as desired.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Referring to the figures by characters of reference, 1 designates a housing of any desired proportions and constructed of suitable materials, the lower portion of this housing providing a furnace 2 in which any heating medium may be used. In the structure illustrated oil burners 3 have been shown at different points but it is to be understood that gas, coal, electricity, etc., can be used as a heating medium, if desired.

The top of the furnace is formed by a roasting pan 4 of any material desired, this pan being provided at one end with an incline 5 having a transverse offset 6 forming a feed trough 7. The bottom of the incline 5 leads to the top portion of an outlet flue 8 extending from one end of the structure 1, it being preferred to use the top of this flue as the bottom of a feed hopper 9 in which finely comminuted ore is held preparatory to being delivered to the roasting chamber. A gate 10 can be mounted between the bottom of the hopper and the incline 5 for regulating the flow of ore onto the incline and into the trough 7.

Suitable openings 11 can be formed in the walls of the heating chamber 2 for the admission of air to support combustion.

Transverse agitator troughs 12 are formed in the upper surface of the pan 4 between the incline 5 and the far end of the pan where the end trough 12 adjoins one side of the upper end of a compartment 13 in which the ore is adapted to be treated to a chemical bath. An outlet 14 is provided at one side of this compartment and opens into a delivery trough 15.

The space above the pan 4 constitutes a roasting chamber 16 and the top of this chamber is closed by a hood 17 that fits snugly against the walls of the housing or casing 1 and can be supported at intermediate points by transverse plates 18 or any other suitable means. Windows 19 can be located wherever desired to permit inspection of the contents of the roasting chamber and at suitable points air inlets 20 can be located, these being controlled by dampers 21 or any other means whereby the flow of air into the roasting chamber can be regulated. A pyrometer 22 of any standard construction can be mounted in a wall of the roasting chamber to indicate the temperature in said chamber.

A deflecting member 23 can be supported over the delivery end of the pan 4 and extend downwardly into the upper portion of the chamber 13 to insure flow of dust in a downward direction only from the end of the pan. Beneath the lower end of this deflecting member is located a baffle 24 and above the baffle is a spray pipe 25 adapted to deliver jets of acid or other chemical onto the baffle and downwardly into chamber 13. Pipe 25 is supplied through a pipe 26 extending from one side of the housing or casing 1.

The plates 18 depending from and supporting the hood 17 divide the interior of the hood into separate pockets 27 and from each of these pockets may be extended an outlet flue 28 for carrying off gaseous by-products.

Mounted for rotation in the chamber 13 is a shaft 29 carrying radially extending agitating arms 30.

Figure 2:
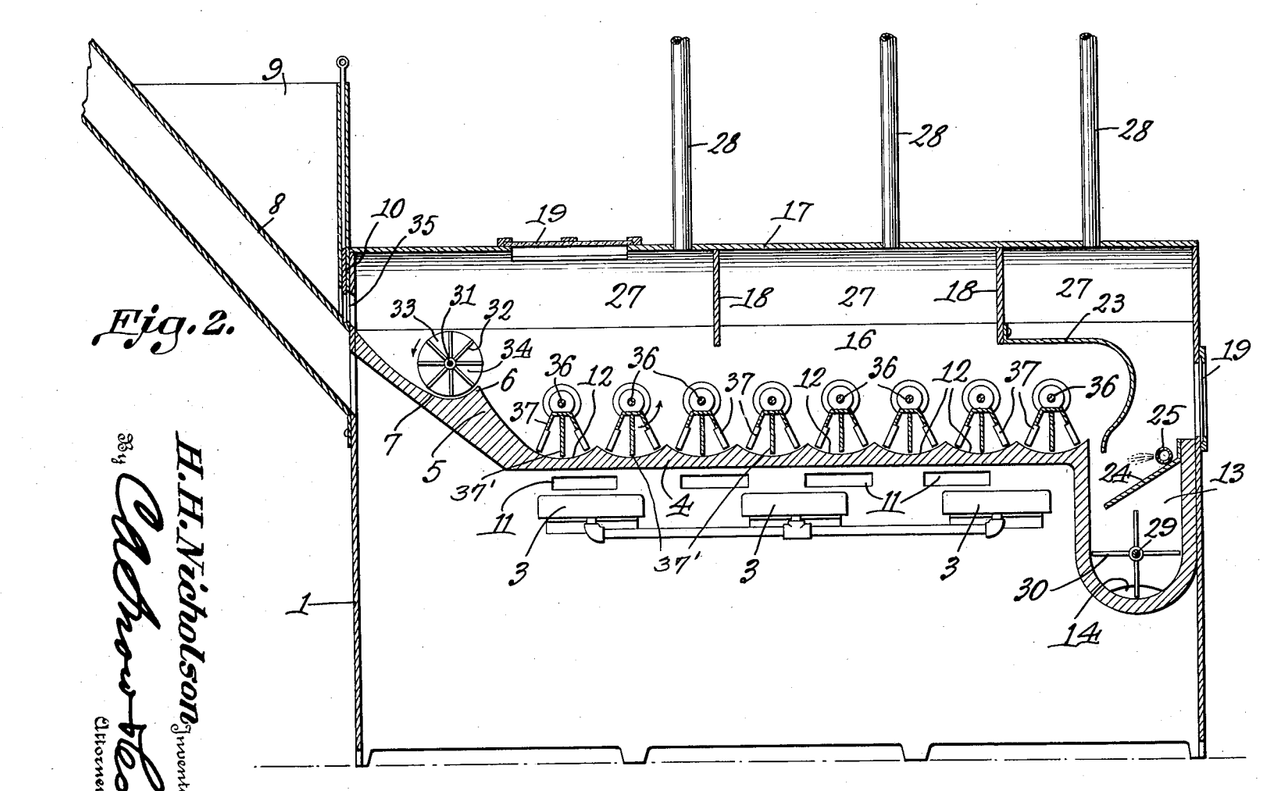
Figure 2 is a vertical longitudinal section therethrough.
Figure 3:
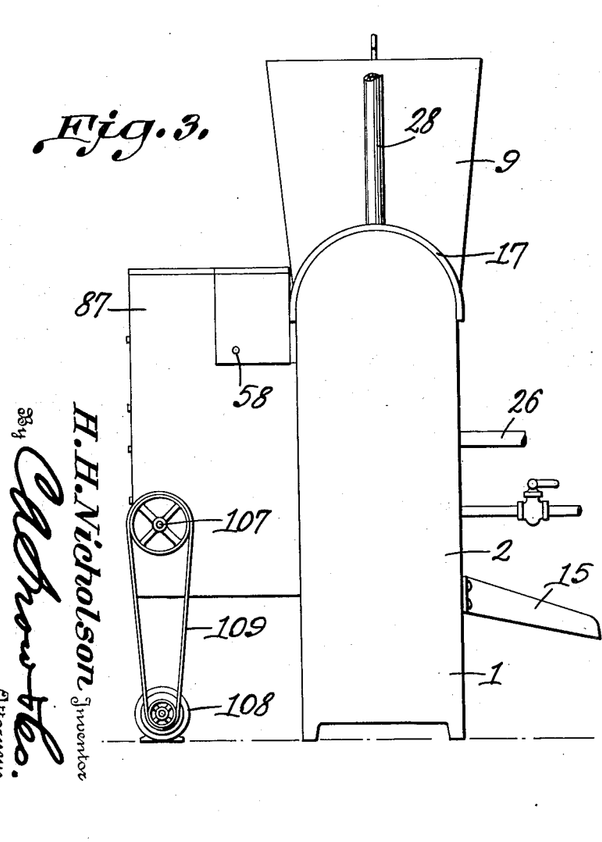
Figure 3 is an elevation of the delivery end of the apparatus.
Figure 4:
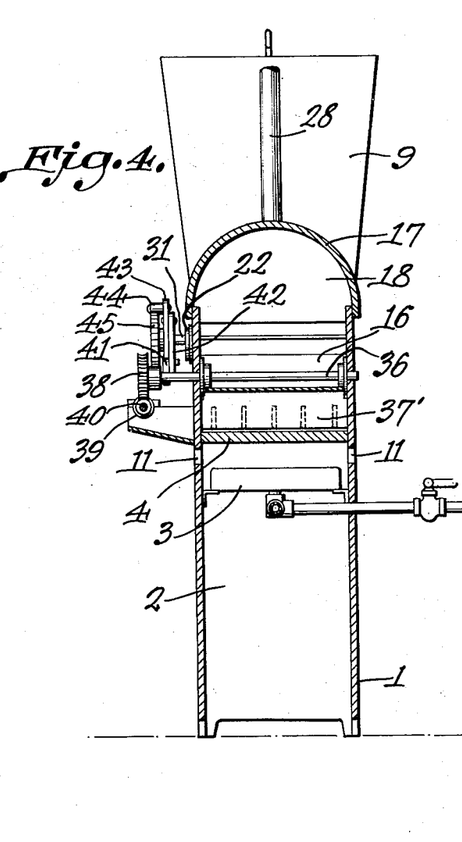
Figure 4 is a section on line 4—4, Figure 1.

A transverse shaft 31 is journaled in the housing or casing 1 above the feed trough 7 and rotatable with this shaft is a feeder comprising radial blades 32 connected at their ends by heads 33. These blades cooperate to form angular pockets 34. Thus when finely comminuted ore is directed through the outlet 35 of hopper 9 onto the upper portion of the incline 5 it will enter certain of the pockets 34 and as the feeder rotates in the direction indicated by the arrow in Figure 2, the contents of certain of the pockets will be carried above the delivery side of the trough 7 and allowed to gravitate along the incline 5 to the first trough 12 of the series.

Mounted for rotation above each of the troughs 12 is an agitator shaft 36. Each shaft has agitating fingers 37 extending therefrom and normally projecting into the adjacent trough 12 close to the surface thereof. Each shaft 36 is adapted to rotate back and forth so as to cause its fingers to oscillate within their particular trough 12. Following a predetermined period of oscillation the shafts are adapted to make one complete rotation, this action being simultaneous with all of the shafts 36. The complete rotation is in the direction indicated by the arrow in Figure 2 and results in the ejection of all of the material from each trough into the next adjoining trough.

As a further result of the foregoing operation, the material in the trough remote from the feeder will be ejected into compartment 13 where it will be subjected to the action of a chemical bath and to agitation. It is to be understood that during the agitation of ore in the respective troughs 12 as heretofore explained the ore will be subjected to heat conducted through the pan from the furnace 2. Thus the ore will be thoroughly roasted but at a comparatively low heat, it being permissible to use this low heat because the ore is retained in the successive troughs during a predetermined period of agitation before it is delivered to another trough for further agitation and heating. Air is admitted to the roasting chamber 16 in controlled quantities so as not to interfere with the proper roasting of the ore. Any gaseous by-products given off during the roasting process will be carried away by the flues 28.

As most ore contains a percentage of sulphur and other deleterious matter which would interfere with proper amalgamation or other final treatment, it is desirable to subject the ore to a chemical bath before it is delivered from the roaster. For this purpose the chamber 13 has been provided. The ore, when delivered into this chamber, will be acted on by a chemical directed thereagainst from the spray pipe 25 and will then be thoroughly agitated in the chamber 13 from which it will emerge in a thick flowing stream through the spout 15 for final treatment.

The chemical used in the treatment of the ore can be returned through pipe 26 to the spray pipe for repeated use.

Figure 1:
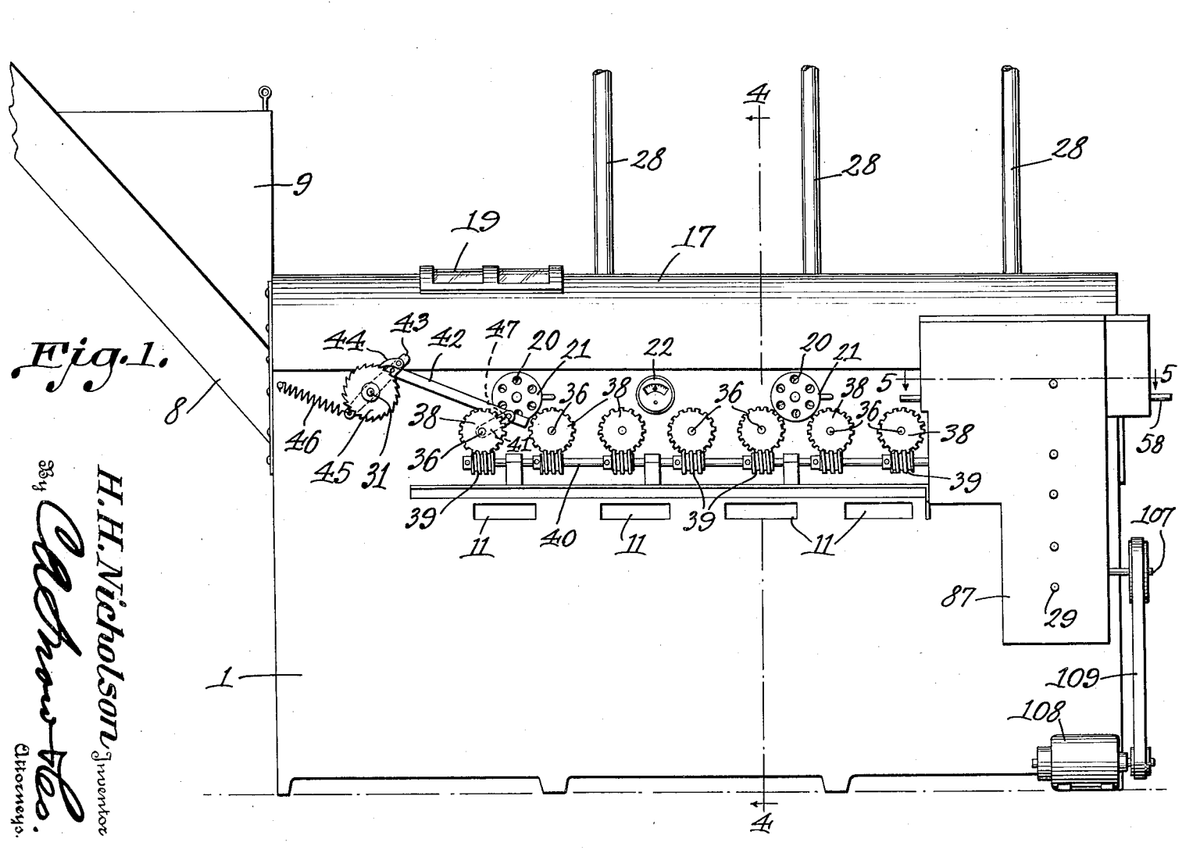
Figure 1 is a side elevation of the apparatus.

The proper operation of this apparatus is dependent on the agitation of the ore in the respective troughs 12 for predetermined periods at which time the feeder 32—33 is at rest. After the period of agitation has passed it is essential that the ore be transferred from one trough to another at which time the feeder must be actuated to direct a new supply of ore into the first agitator trough. Any suitable mechanism may be utilized for producing this mechanical operation but it is preferred to employ the mechanism that has been illustrated. The following is a description thereof:

Secured to each of the shafts 36 is a worm gear 38 and these gears all mesh with worms 39 fastened to a longitudinal shaft 40 located outside of the roasting chamber but parallel with one side thereof. A crank arm 41 rotates with the shaft 36 nearest hopper 9 and located above this crank arm is a push bar 42 pivotally connected to one arm of a lever 43. This lever is mounted to oscillate on shaft 31 and carries a pawl 44 adapted to engage a ratchet wheel 45 that is secured to and rotates with shaft 31. A spring 46 is attached to one arm of lever 43 and serves to hold the pawl 44 normally pressed to the right as shown in Figure 1.

Shaft 40 is adapted to be given several rotations in one direction and then several rotations in the opposite direction, this operation being repeated a predetermined number of times by mechanism provided for that purpose and which will be hereinafter described. During this back and forth rotation of shaft 40 the worm gears 38 will be rotated back and forth but will not make complete rotations. Instead they will merely travel sufficient distances to cause the agitating fingers 37 to oscillate within the respective troughs 12. After a predetermined number of these oscillations which of course occur very slowly, the operating mechanism hereinafter explained will cause the gears to make one complete rotation. During this operation whereby the agitating fingers 37 will sweep the contents of the troughs 12 from one trough to another, the crank arm 41 will come into engagement with the push bar 42, there being a notch 47 in this bar for the reception of a portion of the crank arm. Thus as the crank arm swings from right to left in Figure 1 during the complete rotation of the gears 38, push bar 42 will press against lever 43 to cause pawl 44 to impart a partial rotation to the ratchet wheel 45 and the feeder controlled thereby. After the crank arm 41 has passed downwardly out of engagement with the push bar 42 the spring 46 will return the pawl 44 and the push bar to their initial positions pending a repetition of the foregoing operation.

Secured to the shaft 40 near one end are oppositely disposed spaced coupling collars 48 and 49 and slidably engaging these collars are the ends 50 of a sleeve 51 on which are secured opposed beveled gears 52 and 53. A shifting slide 54 is mounted adjacent to the gears and has a finger 55 that extends between said gears so that when the slide is moved in one direction gear 52 will be moved into mesh with an interposed drive gear 56 while, when the slide is moved in the opposite direction, gear 53 will be brought into mesh with gear 56. Slide 54 has a sleeve 57 in which a rod 58 is mounted. This rod is supported by guides 59 and collars 60 are secured to the rod. Springs 61 bear against the respective collars 60 and against the respective ends of the sleeve 57 so as to constitute yielding means for transmitting motion in either direction from rod 58 to sleeve 57 and the shifting slide 54.

A latch plate 62 is pivotally connected to the rod 58 as shown at 63 and extending from the other end of this latch plate is an arm 64 connected by a link 65 to another arm 66 carried by a rock shaft 67. To this rock shaft is secured a crosshead 68 and pivotally connected to the respective ends of the crosshead and depending therefrom are spaced hangers 69 and 70 the lower or free ends of which are preferably recessed as shown at 71. A spring 72 connects the hangers and serves to hold them yieldingly in a predetermined normal relation.

Figures 5, 7:
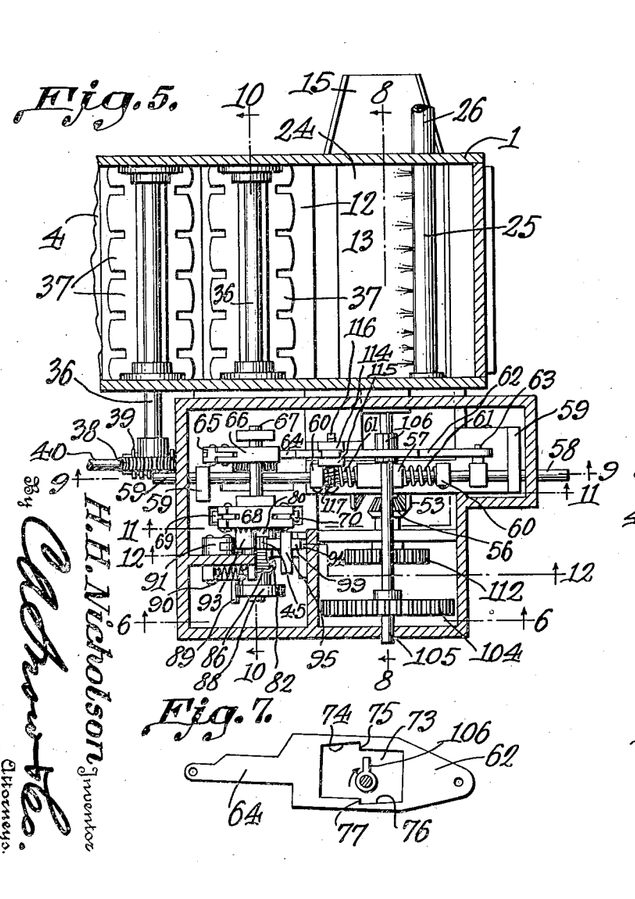
Figure 5 is a section on line 5—5, Figure 1.
Figure 7 is a side view of the latch plate forming a part of the reversing mechanism.
Figure 6:
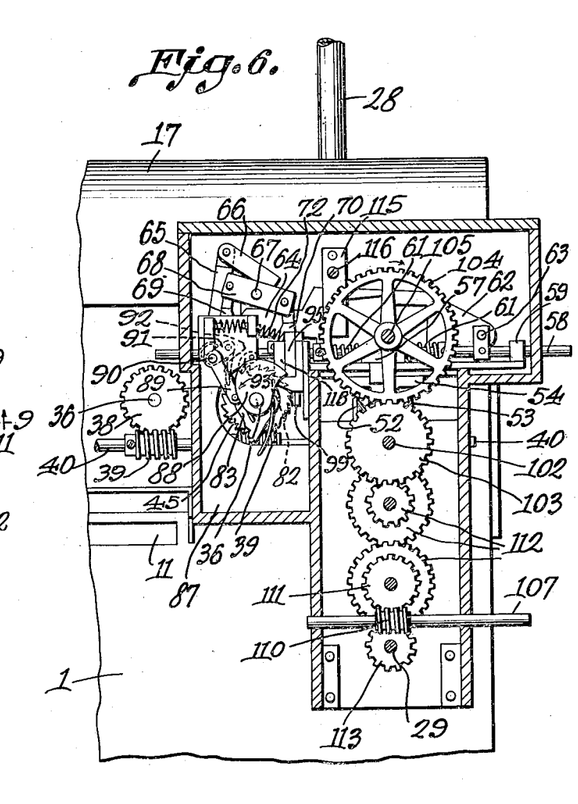
Figure 6 is a section on line 6—6, Figure 5.
Figure 8:
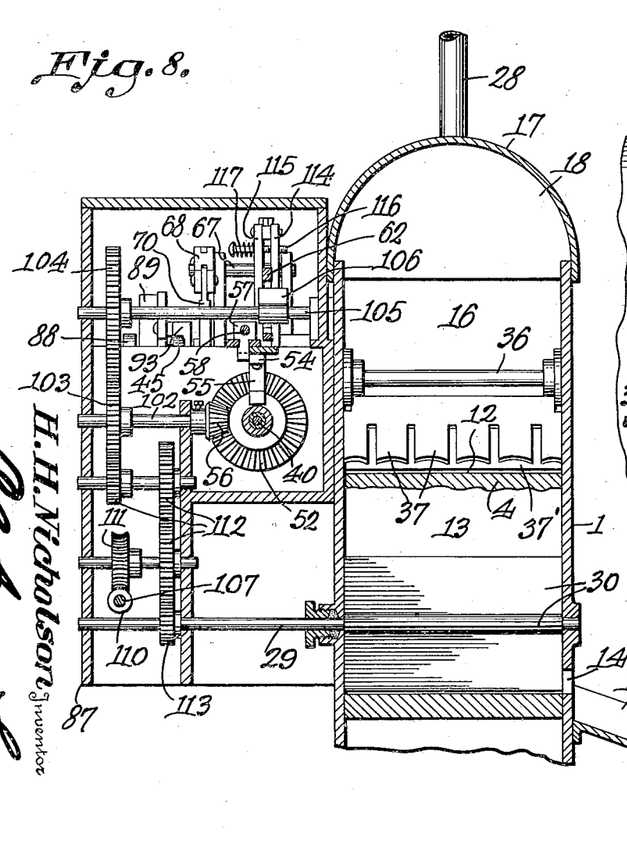
Figure 8 is a section on line 8—8, Figure 5.

The latch plate 62 is shown in detail in Figure 7 and is provided with a relatively large opening 73. The upper wall of this opening is cut away as at 74 to provide a shoulder 75 and the lower wall of the opening is also cut away at 76 to provide a shoulder 77. These shoulders are oppositely disposed.

The shaft 36 nearest chamber 13 is located directly under rock shaft 67 and has secured to it a lifting arm 78 supported between the hangers 69 and 70 and having oppositely extending teeth 79 adapted to engage in the respective recesses 71. Under normal conditions the lifting arm 78 is extended downwardly midway between the hangers 69 and 70.

Figure 10:
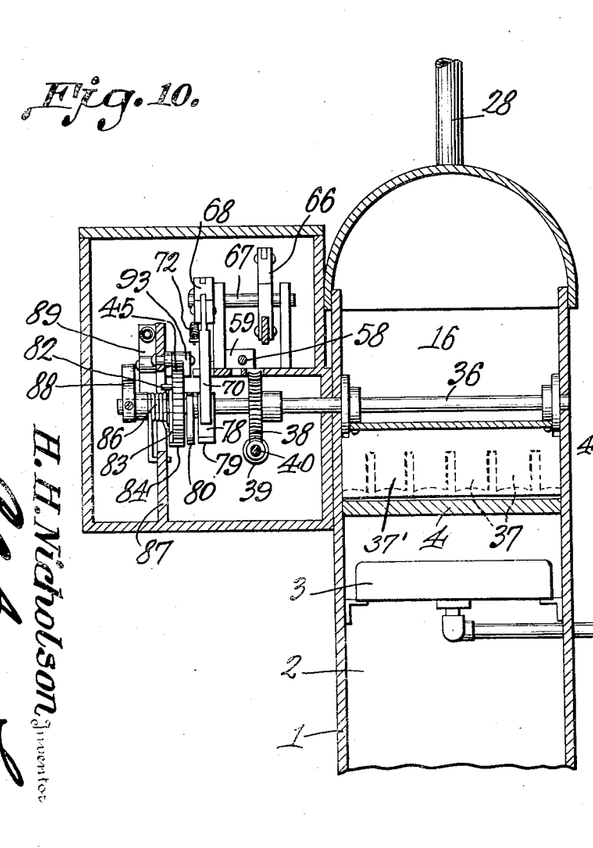
Figure 10 is a section on line 10—10, Figure 5.

The same shaft 36 that carries lifting arm 78 also has a releasing arm 80 secured thereto and movable therewith. This arm is located close to one face of the ratchet wheel 45 that is mounted for rotation on the shaft 36. This ratchet wheel has a pin 82 extending laterally therefrom and adapted to move against a dog 83 mounted for rotation on the shaft 36. A laterally extending flange 84 is located at the outer or free end of the dog and along one edge of this flange is a tooth 85 adapted to engage any one of the teeth of the ratchet wheel. Flange 84 laps the toothed edge of the ratchet wheel as shown particularly in Figure 10. A coiled spring 86 is mounted on the shaft 36 and one end of this spring is attached to the dog 83 while the other end is fixed to a portion of a housing 87 in which the reversing mechanism and the parts cooperating therewith is located.

A cam 88 is secured to and rotates with the shaft 36 on which the ratchet wheel is mounted and this cam is adapted to come against and shift a crank arm 89 secured to a rock shaft 90. An arm 91 radiates from shaft 90 and carries a pawl 92 which normally engages one of the teeth of the ratchet wheel 81. A detent 93 also engages the ratchet wheel and both the pawl and the detent extend laterally beyond one face of said wheel and into the path of the releasing arm 80.

Figure 11:
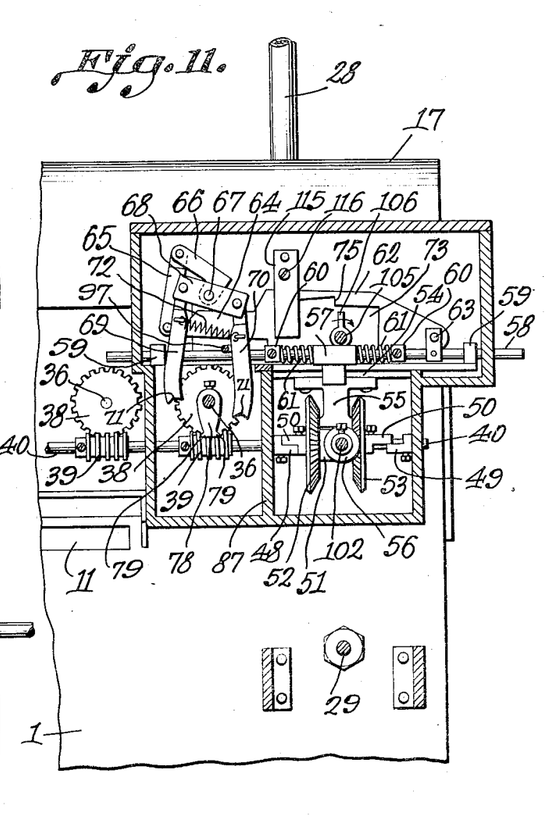
Figure 11 is a section on line 11—11, Figure 5.

Slidably mounted adjacent to the hanger 70 is a shifting block 94 movable in a guide 95. This block has an opening 96 extending downwardly therethrough and a shifting finger 97 is extended laterally from the block between the two hangers 69 and 70 but normally close to the hanger 70 as shown for example, in Figure 11.

Figures 12, 13, 14, 15:
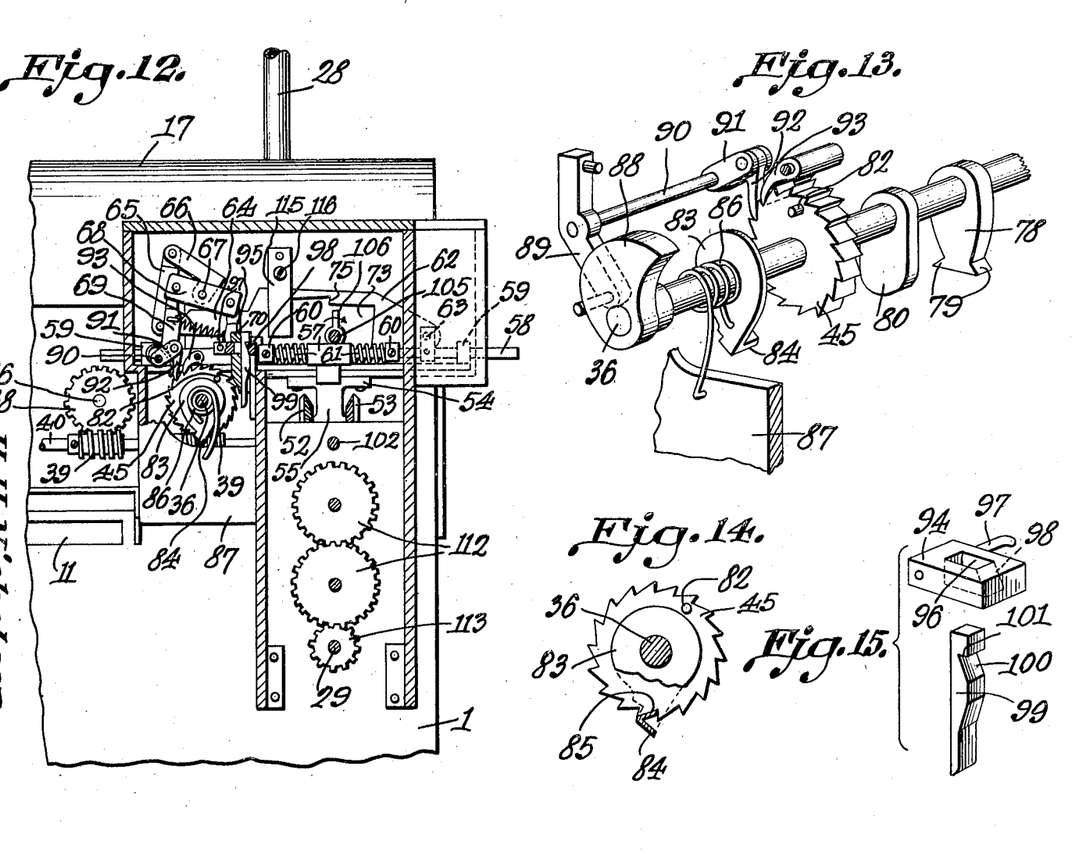
Figure 12 is a section on line 12—12, Figure 5.
Figure 13 is a perspective view of the cam shaft and cooperating parts, the showing being exaggerated for the sake of clearness.
Figure 14 is a section through the flange of the dog showing its tooth in engagement with the ratchet wheel.
Figure 15 is a perspective view of the shifting block and shifting pin, said parts being separated.

One end wall of the opening 96 is undercut and beveled as indicated at 98. A shifting pin 99 is slidable vertically within the opening 96 and within the guide 95 and this pin has a beveled face 100 adapted to bear against the beveled wall 98. Thus when the pin 99 is thrust upwardly within its guide the beveled faces 100 and 98 will cooperate to thrust the shifting block 94 to the right in Figure 12, thereby causing the shifting finger 97 to come against the hanger 70 and swing it out of the path of the lifting arm 78.

When the shifting pin is released from its elevating means, it will move downwardly by gravity to its normal position with an ear 101 resting on the block 94. At the same time spring 72 will pull on hanger 70 so as to thrust it against finger 97 and restore the shifting block to its initial position illustrated for example in Figure 12.

The lower end of the shifting pin 99 is supported in the path of the flange 84 on dog 83.

The drive gear 56 heretofore mentioned is secured to a shaft 102 journaled in the housing 87. Another gear 103 is secured to shaft 102 and transmits motion through a gear 104 to a shaft 105 which extends through the opening 73 in latch plate 62. Mounted on that portion of the shaft 105 in opening 73 is a tappet 106 adapted to swing against either or both of the shoulders 75 and 77 for the purpose of shifting latch plate 62 longitudinally when said plate is raised or lowered from the position shown in Figure 7. The tappet is adapted to revolve in the direction indicated by the arrow in Figure 7.

A power shaft 107 is journaled in housing 87 and is adapted to receive motion from a motor 108 or other source of power through a belt and pulley drive such as indicated generally at 109 or through any other power mechanism that might be provided.

Shaft 107 has a worm 110 constantly meshing with a worm gear 111 which, in turn, drives a train of gears 112 whereby motion is transmitted at a reduced speed to gear 103. One of the gears of this train also meshes with gear 113 on shaft 29.

For the purpose of holding the latch plate 62 in either positions to which it may be shifted by the mechanism provided therefor, a standard 114 is erected at one side of the plate 62. A clamping strip 115 is attached to the upper end of the standard and laps the other side of plate 62. A bolt 116 extends from standard 114 and loosely through strip 115. This bolt carries a spring 117 that constantly thrusts against strip 115. Consequently plate 62 will be constantly gripped between the standard 114 and strip 115 so as to be held frictionally in either raised or lowered position.

The operation of the controlling mechanism is as follows:

Shaft 107 rotates continuously in one direction and, consequently, the agitator shaft 29 also rotates continuously but at a slower speed due to the speed reducing means employed. Continuous motion is also transmitted, but at a reduced speed, to shafts 102 and 105. The gear 56 on shaft 102 will mesh with either of the two gears 52 and 53, thereby rotating the shaft 40 either to the right or to the left. Shaft 105 is constantly rotating the tappet 106 within the opening 73 in latch plate 62.

Assuming that gears 56 and 53 are in mesh, shaft 40 will be rotated slowly in one direction and motion will be transmitted therefrom through the worms 39 and gears 38 to the several agitator shafts 36. The end shaft 36 remote from the feeder will, as it rotates, swing the lifting arm 78 so that one of the teeth 79 will come against the hanger 70. Thus the hanger will be thrust upwardly against crosshead 68 and said crosshead will be shifted so as to cause its arm 66 and link 65 to push the latch plate 62 downwardly. This will bring the upper shoulder 75 into the path of the revolving tappet 106. Thus as shaft 105 completes a rotation tappet 106 will come against shoulder 75 and shift the latch plate 62 longitudinally to the right in Figure 5.

Motion will be transmitted from the latch plate 62 to rod 58 which, in turn, will thrust through one of the springs 61 against sleeve 57 and cause the slide 54 and its finger 55 to push gears 52 and 53 from one extreme position to another. This will bring gear 52 into mesh with gear 56 and result in the immediate reversal of rotation of shaft 40. Consequently after the agitators 37 have moved a short distance in one direction within the respective troughs 12, they will start back in the opposite direction.

During the actuation of the lifting arm 78, cam 88 will come against crank arm 89 and cause the pawl 92 to thrust against one of the teeth of the ratchet wheel 81, thereby imparting a slight rotation to said ratchet wheel and bringing dog 83 and flange 84 closer to the pin 99. When the rotation of shaft 36 is reversed as explained, lifting arm 78 will swing upwardly in the opposite direction and cam 88 will move away from crank arm 79, thereby allowing the pawl 92 to move back one or more notches relative to ratchet wheel 81. As lifting arm 78 moves to the left it will come against the lower end of hanger 69 and thrust it upwardly. This will result in the elevation of the latch plate 62 so that shoulder 77 will come into the path of the tappet 106.

Figure 9:
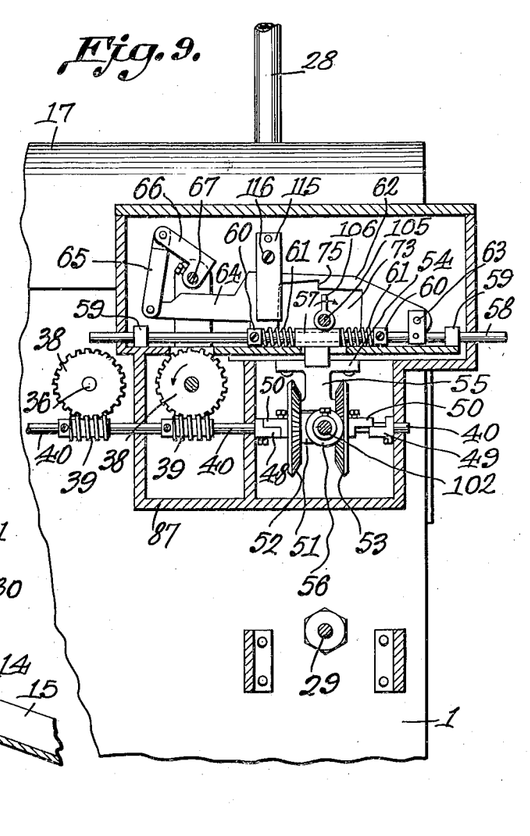
Figure 9 is a section on line 9—9, Figure 5.

The foregoing will result in another shift of gears 52 and 53 which will be returned to the positions shown in Figure 9. Thus during the back and forth rotation of shaft 36 the ratchet wheel 81 will be gradually rotated on its shaft until after a predetermined number of oscillations of the agitators have been effected. Each actuation of shaft 36 in one direction moves the ratchet wheel one notch and carries the stop pin 82 a little further from the stop 118 provided therefor. Ultimately the flange 84 will come against pin 99. The number of oscillations required to bring the flange 84 into engagement with pin 99 will depend on the distance between said flange and pin 82 when the pin is in normal position, against its stop 118. For example, if ten oscillations in one direction are desired during each agitating operation, the dog 83 will be pulled against spring 86 and along shaft 36 to disengage tooth 85 from the ratchet teeth. The dog can then be adjusted annularly relative to the ratchet wheel and brought to position with its tooth 85 located ten teeth from the stop or zero position of the pin 82. Therefore ten shifts of the ratchet wheel will be necessary to bring the flange 84 against pin 99.

The actuation of the dog with the ratchet wheel will gradually swing it until the dog comes against and thrusts upwardly upon the pin 99. This will result in moving block 74 to the right and causing the shifting fingers 97 to pull upon hanger 70 and spring out of the path of the dog 83. Thus when the dog swings to the right it will not operate the reversing mechanism but will be retained while shaft 36 continues to revolve. This will bring the releasing arm 80 against the detent 93 and the pawl 92 which will be thrust out of engagement with the ratchet wheel 81 whereupon the tensioned spring 86 will swing the dog back to its initial position and the ratchet wheel will also be revolved back to its point of starting. When the dog moves downwardly away from the lifting pin 99 said pin will drop to its normal position and the lock 94 will also move to its normal position so as to release the hanger 70. Thus the parts are reset and the operation can be repeated as described.

Attention is directed to the fact that the agitating fingers 37 which diverge downwardly are plated at opposite sides of a central blade 37'. This blade is used to move the ore over the pan 4 when a complete rotation is made. Thus a portion of the ore will not be left in the pan as would be the case should the fingers 37 be relied on for this purpose.

It has been found in practice that by the use of this apparatus it is possible to save practically 100 percent of the values under treatment.

What is claimed is:

1. In ore roasting apparatus a pan having a series of agitator troughs, means for heating the pan, an agitator operating in each trough, means for simultaneously imparting a back and forth motion to the agitators within the respective troughs for predetermined periods, and means for simultaneously shifting the agitators in one direction between periods of motion to direct the contents of each trough into the next adjoining trough.

2. Ore roasting apparatus including a roasting chamber having an ore pan formed with a plurality of agitator troughs, means for heating the pan, an agitator mounted for orcillation in each trough, means for imparting a predetermined number of oscillations to all of the agitators simultaneously, and means for rotating the agitators simultaneously between periods of oscillation thereby to direct the contents from each trough into the next adjoining trough.

3. Ore roasting apparatus including a pan having separate agitator troughs, an agitator adapted to oscillate in each trough, means for imparting a predetermined number of oscillations to the agitators simultaneously, means for simultaneously rotating the agitators to expel the contents of the troughs thereby to pass them from one trough to another along the pan.

4. The combination with a bath chamber, of means for feeding roasted ore thereto a pan having separate transverse agitator troughs, an agitator adapted to oscillate in each trough longitudinally of the pan, means for imparting a predetermined number of oscillations to the agitators simultaneously, and means for simultaneously rotating the agitators to expel the contents of the troughs thereby to pass them from one trough to another along the pan and from the pan to said chamber.

5. Ore roasting apparatus including a pan having a plurality of transverse agitator troughs, an agitator mounted to work within each trough longitudinally of the pan, means for actuating all of the agitators to produce a predetermined number of oscillations, all of the agitators oscillating simultaneously, means for automatically rotating all of the agitators between periods of oscillation thereby to shift the contents of each trough to the next adjoining trough, and means controlled by the rotation of the agitators for feeding untreated material to one of the troughs.

6. Ore roasting apparatus including a pan having a plurality of agitator troughs, feeding means at one end of the pan, a bath chamber at the other end of the pan, agitators mounted to work within the respective troughs, means for simultaneously oscillating all of the agitators a predetermined number of times, means for automatically rotating all of the agitators simultaneously between periods of oscillation to advance the contents of each trough to the next adjoining trough and from the end of the pan to the bath chamber, and means controlled by the rotation of the agitators for operating the feeding means to direct a measured quantity of untreated material on to the pan.

7. An ore roasting apparatus including a pan, means for heating the same, means for supplying measured quantities of untreated material to one end of the pan, separate means cooperating with the pan for reciprocating material supported by the pan, and mechanism for actuating said separate means simultaneously between predetermined periods of reciprocation, for transferring material from one of said separate means to another.

8. In apparatus of the class described the combination with a heating chamber, a roasting chamber, and a pan disposed between the chambers, of means for supplying untreated material to the pan at one end thereof, separate agitating means above the pan, means for simultaneously moving the agitating means back and forth during successive time periods, and means for actuating the agitating means in one direction between said time periods to advance material along the table from one agitating means to another.

9. The combination with a bath chamber, of means for feeding roasted ore thereto including a heating chamber, a roasting chamber, a pan disposed between the chambers, means for supplying untreated material to the pan at one end thereof, separate agitating means above the pan, means for simultaneously actuating the agitating means during successive time periods to reciprocate material engaged thereby, and means for actuating the agitating means between said time periods to advance material along the table from one agitating means to another and delivering it intermittently to said chamber, following each period of reciprocation of the material.

10. The combination with a bath chamber, of means for feeding roasted ore thereto including a roasting chamber, a pan constituting the bottom thereof, feeding means at one end of the pan, agitating means supported above the pan at different points and extending transversely thereof, means for simultaneously oscillating all of the agitating means a predetermined number of times to move material back and forth longitudinally of the pan, means for simultaneously rotating the agitating means between periods of agitation, thereby to advance material along the pan with an intermittent motion to the chamber, and means operated by the rotation of the agitating means for directing a measured quantity of untreated material on to the pan for treatment.

11. The combination with a bath chamber, of means for feeding roasted ore thereto intermittently including a roasting chamber, separate agitating means therein, feeding means, means for simultaneously oscillating the agitating means a predetermined number of times to impart a back and forth movement to the ore longitudinally of the pan, means for simultaneously rotating the agitating means between periods of oscillation thereby to advance material being treated from one agitating means to the other and ultimately to said bath chamber, and means controlled by the rotation of the agitating means for operating the feeding means to direct a measured quantity of untreated material into position for engagement by the agitating means.

12. Apparatus of the class described including a roasting chamber, a pan constituting the bottom thereof, means for heating the pan at a relatively low temperature, means for directing untreated material on to the pan at one end thereof, separate means for reciprocating material on the pan at different points while being heated, said material reciprocating means constituting means for transferring the material under treatment from one of said separate means to another following predetermined periods of reciprocation.

13. The combination with a bath chamber, of means for supplying roasted ore thereto including a roasting chamber, a pan constituting the bottom thereof, means for heating the pan at a relatively low temperature, means for directing untreated material on to the pan at one end thereof, and means for agitating material on the pan by a back and forth motion longitudinally of the pan at different points while being heated, said agitating means constituting means for transferring the material under treatment from one agitating means to another following predetermined periods of back and forth agitation.

14. Apparatus of the class described including a roasting chamber, a pan constituting the bottom thereof, means for heating the pan, transverse shafts, agitating elements movable with the shafts for agitating material on the pan at different points, means for simultaneously oscillating the shafts back and forth to oscillate the agitating elements for a predetermined time period, and means for completely rotating all of the shafts simultaneously following each period of oscillation thereby to actuate the oscillating members to transfer material being treated from one point to another on the pan for successive agitation.

15. The combination with a bath chamber, of means for feeding roasted ore thereto intermittently including a roasting chamber, a pan constituting the bottom thereof, means for heating the pan, transverse shafts, agitating elements movable with the shafts for agitating material on the pan back and forth longitudinally of the pan at different points, means for simultaneously oscillating the shafts back and forth to oscillate the agitating elements for a predetermined time period, and means for completely rotating all of the shafts simultaneously following each period of oscillation thereby to actuate the oscillating members to transfer material being treated from one point to another on the pan for successive agitation.

16. Ore roasting apparatus including a roasting chamber having an ore pan formed with a plurality of agitating troughs, means for heating the pan, downwardly diverging agitating fingers mounted for oscillation in each trough, a downwardly extending blade interposed between the diverging fingers, means for imparting a predetermined number of oscillations to all of the agitating fingers and the blades simultaneously, and means for rotating the agitating fingers and blades simultaneously between periods of oscillation thereby to force the blades against the contents of the troughs to direct said contents from each trough into the next adjoining trough.

17. In ore roasting apparatus a pan having a series of agitator troughs extending transversely of the direction of flow of ore through the apparatus, means for heating the pan, an agitator operating in each trough, means for simultaneously oscillating the agitators within the respective troughs for predetermined periods about axes extending transversely of the direction of flow, and means for simultaneously shifting the agitators between periods of oscillation to direct the contents of each trough into the next adjoining trough.

18. Ore roasting apparatus including a roasting chamber having an ore pan formed with a plurality of transverse agitator troughs, means for heating the pan, an agitator mounted for oscillation in each trough and longitudinally of the pan, means for imparting a predetermined number of oscillations to all of the agitators simultaneously, and means for rotating the agitators simultaneously between periods of oscillation thereby to direct the contents from each trough into the next adjoining trough.

19. Ore roasting apparatus including a pan having separate transverse agitator troughs, an agitator adapted to oscillate in each trough longitudinally of the pan, means for imparting a predetermined number of oscillations to the agitators simultaneously, means for simultaneously rotating the agitators to expel the contents of the troughs thereby to pass them from one trough to another along the pan.

20. Ore roasting apparatus including a pan having a plurality of transverse agitator troughs, feeding means at one end of the pan, a bath chamber at the other end of the pan, agitators mounted to work longitudinally of the pan within the respective troughs, means for simultaneously oscillating all of the agitators a predetermined number of times, means for automatically rotating all of the agitators simultaneously between periods of oscillation to advance the contents of each trough to the next adjoining trough and from the end of the pan to the bath chamber, and means controlled by the rotation of the agitators for operating the feeding means to direct a measured quantity of untreated material on to the pan.

21. An ore roasting apparatus including a pan, means for heating the same, means for supplying measured quantities of untreated material to one end of the pan, separate means cooperating with the pan for agitating material supported by the pan back and forth longitudinally of the pan, and mechanism for actuating said separate means simultaneously between predetermined periods of back and forth agitation, for transferring material from one agitating means to another.

22. In apparatus of the class described the combination with a heating chamber, a roasting chamber, and a pan disposed between the chambers, of means for supplying untreated material to the pan at one end thereof, separate agitating means above the pan, means for simultaneously actuating the agitating means during successive time periods, to move material back and forth longitudinally of the pan, and means for actuating the agitating means between said time periods of back and forth agitation to advance material along the pan from one agitating means to another.

23. Apparatus of the class described including a roasting chamber, a pan constituting the bottom thereof, means for heating the pan at a relatively low temperature, means for directing untreated material on to the pan at one end thereof, means for imparting a back and forth movement to material on the pan at different points to agitate the material while being heated, said agitating means constituting means for transferring the material under treatment from one agitating means to another following predetermined periods of agitation.

24. Ore roasting apparatus including a roasting chamber having an ore pan formed with a plurality of transverse agitating troughs, means for heating the pan, downwardly diverging agitating fingers mounted for oscillation in each trough, a downwardly extending blade interposed between the diverging fingers, means for imparting a predetermined number of oscillations to all of the agitating fingers and the blades simultaneously to agitate ore back and forth in the troughs longitudinally of the pan, and means for rotating the agitating fingers and blades simultaneously between periods of oscillation thereby to force the blades against the contents of the troughs to direct said contents from each trough into the next adjoining trough.

In testimony that I claim the foregoing as my own, I have hereto affixed my signature.

HENRY HARRISON NICHOLSON.